US008893743B2

United States Patent
Okabe et al.

(10) Patent No.: US 8,893,743 B2
(45) Date of Patent: Nov. 25, 2014

(54) FLOW RATE CONTROLLER AND PROCESSING APPARATUS

(71) Applicant: Tokyo Electron Limited, Tokyo (JP)

(72) Inventors: Tsuneyuki Okabe, Oshu (JP); Shuji Moriya, Nirasaki (JP); Kazushige Matsuno, Tokyo (JP)

(73) Assignee: Tokyo Electron Limited (JP)

( * ) Notice: Subject to any disclaimer, the term of this patent is extended or adjusted under 35 U.S.C. 154(b) by 25 days.

(21) Appl. No.: 13/650,247

(22) Filed: Oct. 12, 2012

(65) Prior Publication Data

US 2013/0092264 A1   Apr. 18, 2013

(30) Foreign Application Priority Data

Oct. 14, 2011   (JP) ................................. 2011-227116

(51) Int. Cl.
| | |
|---|---|
| F16K 31/02 | (2006.01) |
| G05D 7/06 | (2006.01) |
| G01F 1/68 | (2006.01) |
| G01F 5/00 | (2006.01) |

(52) U.S. Cl.
CPC ................ G05D 7/0635 (2013.01); G01F 1/68 (2013.01); G01F 5/00 (2013.01)
USPC ................... 137/487.5; 137/486; 156/345.26; 156/345.24; 156/345.15; 118/715

(58) Field of Classification Search
USPC ............. 137/486, 487.5; 156/345.26, 345.24, 156/345.15; 118/715
See application file for complete search history.

(56) References Cited

U.S. PATENT DOCUMENTS

| | | | | |
|---|---|---|---|---|
| 5,062,446 | A | * | 11/1991 | Anderson ....................... 137/468 |
| 5,439,026 | A | * | 8/1995 | Moriya et al. ................. 137/486 |
| 5,441,076 | A | * | 8/1995 | Moriya et al. ................. 137/486 |
| 5,573,032 | A | * | 11/1996 | Lenz et al. ..................... 137/486 |
| 5,669,419 | A | * | 9/1997 | Haas ............................... 137/895 |
| 5,827,179 | A | * | 10/1998 | Lichter et al. ................. 600/300 |
| 5,911,238 | A | * | 6/1999 | Bump et al. ................ 137/487.5 |
| 6,389,364 | B1 | * | 5/2002 | Vyers ............................. 702/45 |
| 6,439,253 | B1 | * | 8/2002 | Easton .............................. 137/9 |
| 7,069,944 | B2 | * | 7/2006 | Morikawa et al. ......... 137/487.5 |
| 7,533,009 | B2 | * | 5/2009 | Watanabe et al. ................. 703/6 |
| 7,658,204 | B2 | * | 2/2010 | Ishida ............................ 137/486 |
| 7,809,473 | B2 | * | 10/2010 | Shajii et al. ................... 700/282 |

(Continued)

FOREIGN PATENT DOCUMENTS

| | | |
|---|---|---|
| JP | 2005222173 | 8/2005 |
| WO | 2008016189 | 2/2008 |

*Primary Examiner* — Eric Keasel
*Assistant Examiner* — Minh Le
(74) *Attorney, Agent, or Firm* — Cantor Colburn LLP (57) ABSTRACT

The flow rate controller controlling a flow rate of gas supplied through a gas passage includes: a main gas pipe; a flow rate detecting unit detecting the flow rate of gas supplied through the main gas pipe and outputting a flow rate signal; a flow rate control valve mechanism controlling a flow rate; a conversion data storage unit storing a plurality of pieces of conversion data corresponding to a plurality of gaseous species, to indicate a relationship between a flow rate instruction signal input from outside and a target flow rate; and a flow rate control main body which selects the corresponding conversion data from the conversion data based on a gaseous species selection signal input from outside, calculates the target flow rate based on the flow rate instruction signal, and controls the flow rate control valve mechanism based on the target flow rate and the flow rate signal.

4 Claims, 4 Drawing Sheets

(56) References Cited

U.S. PATENT DOCUMENTS

| | | | |
|---|---|---|---|
| 8,087,427 B2* | 1/2012 | Suzuki et al. | 137/486 |
| 8,356,623 B2* | 1/2013 | Isobe et al. | 137/486 |
| 2002/0189682 A1* | 12/2002 | Linthorst | 137/487.5 |
| 2003/0036272 A1* | 2/2003 | Shamouilian et al. | 438/691 |
| 2005/0171749 A1* | 8/2005 | Watanabe et al. | 703/8 |
| 2007/0181255 A1* | 8/2007 | Hayasaka et al. | 156/345.33 |
| 2010/0000608 A1* | 1/2010 | Goto et al. | 137/2 |
| 2010/0163119 A1* | 7/2010 | Isobe et al. | 137/486 |
| 2011/0108128 A1* | 5/2011 | Kishimoto et al. | 137/12 |
| 2012/0000607 A1* | 1/2012 | Ito et al. | 156/345.26 |
| 2012/0186655 A1* | 7/2012 | Smirnov et al. | 137/1 |
| 2012/0267340 A1* | 10/2012 | Kakimoto et al. | 216/37 |
| 2012/0305188 A1* | 12/2012 | Kato et al. | 156/345.26 |
| 2013/0118688 A1* | 5/2013 | Tahara et al. | 156/345.26 |

\* cited by examiner

FLOW RATE CONTROLLER AND PROCESSING APPARATUS

CROSS-REFERENCE TO RELATED PATENT APPLICATIONS

This application claims the benefit of Japanese Patent Application No. 2011-227116, filed on Oct. 14, 2011, in the Japan Patent Office, the disclosure of which is incorporated herein in its entirety by reference.

BACKGROUND OF THE INVENTION

1. Field of the Invention

The present invention relates to an apparatus for controlling a flow rate of a gas supplied when processing a processing target, for example, a semiconductor wafer, and a processing apparatus using the flow rate controller.

2. Description of the Related Art

In general, a semiconductor device is manufactured by repeatedly performing various processes, such as film forming, etching, annealing, and oxidization diffusing, on a semiconductor wafer, for example, a silicon substrate. In order to perform the above-described various processes, various processing gases are used. In this case, there is a need to control a process temperature, a process pressure, and a flow rate of the processing gas with high accuracy in order to stably perform the process.

A flow rate controller, for example, a mass flow controller, is generally used as an apparatus for controlling the flow rate of the processing gas with high accuracy (refer to Patent References 1 and 2). The flow rate controller obtains a flow rate (mass flow rate) by using amount of heat movement, which occurs due to flow of a gas inside a sensor pipe, as a resistance variation of a resistance wire having a resistance value varying depending on a temperature. In this case, conversion data showing a relationship between a flow rate instruction signal, which corresponds to a flow rate setting value input by an operator, and a target flow rate is previously stored in the flow rate controller. The flow rate controller automatically controls a flow rate under a feedback control so as to realize the target flow rate corresponding to the flow rate instruction signal.

However, since the flow rate controller controls the flow rate based on the amount of heat movement occurring due to flow of a gas, if a used gaseous species has a different specific heat, the flow rate of the gas changes due to the different specific heat. Thus, in a conventional flow rate controller, a correction value, that is, a conversion factor (hereinafter, referred to as "CF value"), of various gaseous species is previously determined based on a reference gaseous species, for example, $N_2$ gas. Also, when the flow rate controller is supplied, the flow rate controller in which conversion data obtained based on the CF value of a gaseous species designated when a user ordered is stored is supplied.

In an actual processing apparatus, various gases are used. In this case, one flow rate controller may control a flow rate of one or more gaseous species in addition to a gaseous species determined when the flow rate controller is supplied, in order to reduce an installation cost. In this case, an operator of the processing apparatus manually calculates a corrected flow rate based on the CF value of a gaseous species of which a flow rate is to be newly controlled, and the corrected flow rate is input by the operator so as to store the corrected flow rate.

However, since a CF value differs depending on a manufacturer or model of a flow rate controller, a calculation becomes complicated when inputting the CF value, and also, a calculation error may occur.

3. Prior Art Reference (Patent Reference 1) Japanese Laid-Open Patent Publication No. 2005-222173

(Patent Reference 2) International Patent Publication No. WO 2008-016189

SUMMARY OF THE INVENTION

The present invention provides a flow rate controller capable of performing flow control on a plurality of gaseous species without performing a complex manipulation, and a processing apparatus using the flow rate controller.

According to an aspect of the present invention, there is provided a flow rate controller which controls a flow rate of gas supplied through a gas passage, the flow rate controller includes: a main gas pipe which is connected to the gas passage; a flow rate detecting unit which detects a flow rate of gas supplied through the main gas pipe and outputs a flow rate signal; a flow rate control valve mechanism which is provided on the main gas pipe and controls a flow rate by changing an opening degree of a valve; a conversion data storage unit which stores a plurality of pieces of conversion data corresponding to a plurality of gaseous species, the plurality of pieces of conversion data indicating a relationship between a flow rate instruction signal input from outside and a target flow rate; and a flow rate control main body which selects the corresponding conversion data from the plurality of pieces of conversion data based on a gaseous species selection signal input from outside, calculates the target flow rate based on the flow rate instruction signal, and controls the flow rate control valve mechanism based on the target flow rate and the flow rate signal.

According to another aspect of the present invention, there is provided a processing apparatus which performs processing on a processing target, the processing apparatus includes: a processing apparatus main body which includes a processing container accommodating the processing target and performs processing on the processing target; an exhaust system which exhausts the inside of the processing container; a gas supply system which includes a gas passage in which the flow rate controller is provided, wherein a plurality of branched gas passages in which an opening/closing valve is respectively provided are formed at an upstream side of the flow rate controller in the gas passage to supply different gaseous species and wherein the gas passage at a downstream side of the flow rate controller is connected to the processing container; and an apparatus controller which includes an input/output unit for inputting/outputting processing information comprising at least information regarding the gaseous species and a set flow rate, and controls the whole processing apparatus.

Additional object and advantages of the invention will be set forth in the description which follows, and in part will be obvious from the description, or may be learned by practice of the invention.

The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general descrip

DETAILED DESCRIPTION OF THE INVENTION

An embodiment of the present invention achieved on the basis of the findings given above will now be described with reference to the accompanying drawings. In the following description, the constituent elements having substantially the same function and arrangement are denoted by the same reference numerals, and a repetitive description will be made only when necessary.

Hereinafter, the present invention will be described in detail by explaining exemplary embodiments of the invention with reference to the attached drawings.

Figure 1:
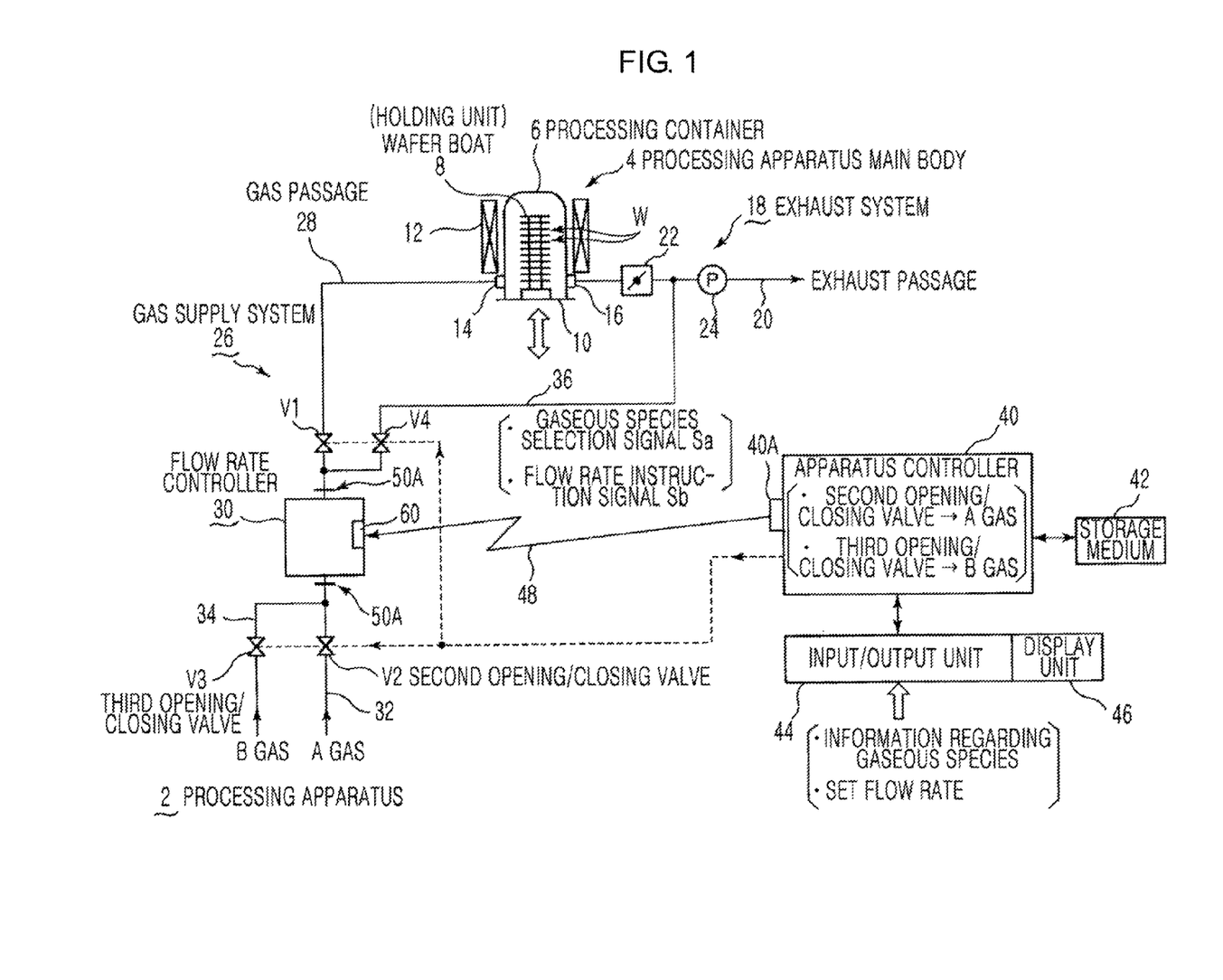
- FIG. 1 is a schematic view of a processing apparatus using a flow rate controller according to an embodiment of the present invention.
Figure 2:
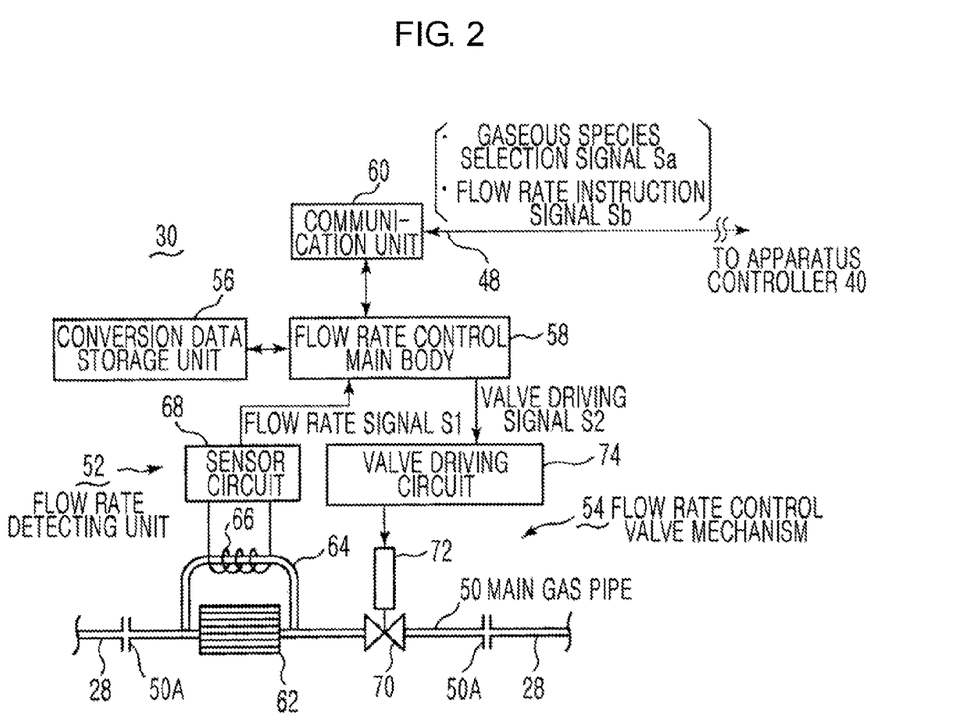
FIG. 2 is a block diagram of the flow rate controller of according to the embodiment of the present invention.
Figure 3:
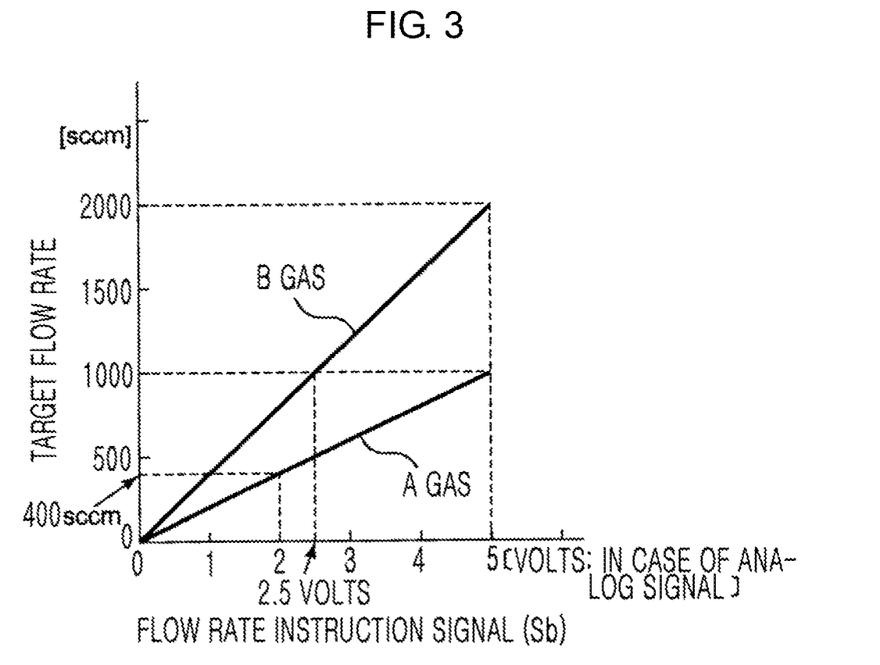
FIG. 3 is a graph showing conversion data stored in a conversion data storage unit of the flow rate controller of according to the embodiment of the present invention.

FIG. 1 is a schematic view of a processing apparatus using a flow rate controller according to an embodiment of the present invention. FIG. 2 is a block diagram of the flow rate controller of according to the embodiment of the present invention. FIG. 3 is a graph showing conversion data stored in a conversion data storage unit of the flow rate controller of according to the embodiment of the present invention.

As shown in FIG. 1, the processing apparatus 2 includes a processing apparatus main body 4 that performs processing on a semiconductor wafer W formed of a silicon substrate, which is a processing target. The processing apparatus main body 4 includes a processing container 6 that has a cylindrical shape with a ceiling and is formed of a heat-resistant material, for example, quartz. A wafer boat 8 is provided inside the processing container 6 to serve as a holding unit. A plurality of the semiconductor wafers W are supported by the wafer boat 8 in multiple stages.

An opening formed at a lower end of the processing container 6 is sealed airtight by a cover unit 10 supporting the wafer boat 8. The cover unit 10 is moved up and down by a boat elevator (not shown). The cover unit 10 and the wafer boat 8 move up and down in an integrated manner so as to load/unload the wafer boat 8 into/from the processing container 6.

A heating unit 12 having a cylindrical shape is provided at a peripheral portion of the processing container 6 so as to heat the semiconductor wafer W disposed inside the processing container 6 to a predetermined temperature and maintain the temperature. Also, a gas introduction port 14 for introducing gas into the processing container 6 and a gas exhaust port 16 are provided on a lower side wall of the processing container 6. An exhaust system 18 is provided on the gas exhaust port 16 to exhaust the atmosphere of the processing container 6. In detail, the exhaust system 18 includes an exhaust passage 20 connected to the gas exhaust port 16, and a pressure control valve 22 and an exhaust pump 24 are sequentially provided along the exhaust passage 20. In this case, the inside of the processing container 6 is maintained around atmospheric pressure or at vacuum atmosphere according to a processing manner.

Also, a gas supply system 26 for supplying gas required for processing into the processing container 6 is provided on the gas introduction port 14. Although only one gas supply system 26 is shown in FIG. 1, a plurality of gas supply systems 26 may be provided in correspondence to the plurality of gaseous species that are actually used.

The gas supply system 26 includes a gas passage 28 connected to the gas introduction port 14. The flow rate controller 30 is provided in the middle of the gas passage 28 to control flow rates of the plurality of gaseous species, which will be described below. The structure of the flow rate controller 30 will now be described.

A first opening/closing valve V1 to open and close the gas passage 28 is provided at the more downstream side of the gas passage 28 than the flow rate controller 30. Also, a plurality of (here, two) branched gas passages 32 and 34 are formed at the upstream side of the gas passage 28. Also, second and third opening/closing valves V2 and V3 are provided in the middle of the branched gas passages 32 and 34, respectively, to open and close the branched gas passages 32 and 34.

Also, different gaseous species, for example, A and B gases, are supplied through the branched gas passages 32 and 34, respectively. Thus, the A and B gases may be selectively supplied by changing the second and third opening/closing valves V2 and V3. In FIG. 1, the A gas is supplied through the branched gas passage 32, and the B gas is supplied through the branched gas passage 34. Also, the branched gas passages are not limited to two, and a greater number of branched gas passages may be formed to supply more different gaseous species.

A vent pipe 36 connects the gas passage 28 between the flow rate controller 30 and the first opening/closing valve V1 with the exhaust passage 20 between the pressure control valve 22 and the exhaust pump 24 of the exhaust system 18 so as to supply gas to the exhaust system 18 without passing through the processing container 6. A fourth opening/closing valve V4 is provided in the middle of the vent pipe 36 to open and close the vent pipe 36.

The processing apparatus 2 includes an apparatus controller 40 for totally controlling the processing apparatus 2. The apparatus controller 40 may be configured as, for example, a computer, and a program of the computer is stored in a storage medium 42. The storage medium 42 may be, for example, a flexible disc, a CD, a hard disc, a flash memory, or a DVD. In detail, starting or stopping of supply of gases, controlling of a flow rate, and controlling of a process temperature or a process pressure are performed by commands received from the apparatus controller 40.

Also, the apparatus controller 40 includes an input/output unit 44 that inputs various pieces of information required for controlling, e.g., information regarding the gaseous species, a set flow rate, timing of opening/closing operations of the opening/closing valves or outputs necessary processing information to an operator of the processing apparatus 2. Also, a display unit 46 is provided in the input/output unit 44 to visually display necessary information.

For example, the display unit 46 may display to change a maximum flow rate (full scale) of various gases supplied by the flow rate controller 30 in such a way that the displayed maximum flow rate can be changed. The input/output unit 44 includes, for example, a number pad via which various numerical values are input to input or correct various pieces of processing information regarding a process recipe. The input/output unit 44 may be configured as, for example, a touch panel sensor.

A relationship between the used gaseous species and the opening/closing valve is previously set in a memory of the apparatus controller 40. The memory may designate, for example, the opening/closing valve as information regarding the gaseous species to specify the used gaseous species. For example, if an instruction to "open" the second opening/closing valve V2 is input in the process recipe, it means to supply the "A gas". If an instruction to "open" the third opening/closing valve V3 is input in the process recipe, it means to supply the "B gas". Also, if the gaseous species is specified, the apparatus controller 40 may transmit a gaseous species selection signal Sa representing the specified gaseous species and a flow rate instruction signal Sb representing a flow rate of the gaseous species to the flow rate controller 30 via a communication line 48.

The apparatus controller 40 includes a communication board 40A to perform the above-described communication. Here, the communication board 40A may perform, for example, digital communications. For example, digital communication using the RS485 standard is used.

<Configuration of Flow Rate Controller>

Next, the configuration of the flow rate controller 30 will be described with reference to FIGS. 2 and 3. The flow rate controller 30 is provided in the middle of the gas passage 28. The flow rate controller 30 includes a main gas pipe 50 of which both ends are respectively connected to an upstream side and a downstream side of the gas passage 28. The both ends of the main gas pipe 50 are connected to the gas passage 28 via respective flanges 50A.

The flow rate controller 30 includes a flow rate detecting unit 52, a flow rate control valve mechanism 54, a conversion data storage unit 56, and a flow rate control main body 58. The flow rate detecting unit 52 detects a flow rate of gas supplied through the main gas pipe 50 to output a flow rate signal S1. The flow rate control valve mechanism 54 is provided on the main gas pipe 50 to control the flow rate of the gas. The conversion data storage unit 56 stores a plurality of pieces of conversion data corresponding to a plurality of gaseous species, to indicate a relationship between a flow rate instruction signal Sb input from outside and a target flow rate. The flow rate control main body 58 selects the corresponding conversion data from the plurality of pieces of conversion data based on a gaseous species selection signal Sa input from outside, calculates the target flow rate based on the flow rate instruction signal Sb, and controls the flow rate control valve mechanism 54 based on the target flow rate and the flow rate signal S1.

A communication unit 60 which performs communication with the outside is connected to the flow rate control main body 58 to bilaterally perform communication (digital communication) with the apparatus controller 40 as described above.

The flow rate detecting unit 52 includes a bypass pipe 62 provided in the middle of the main gas pipe 50, and a sensor pipe 64 connected to both sides of the bypass pipe 62 to bypass the bypass pipe 62. The flow of gas flowing through the main gas pipe 50 may be divided to the bypass pipe 62 and the sensor pipe 64 at predetermined rates.

A resistance wire 66 is wound on the sensor pipe 64 in a lengthwise direction, wherein a resistance value of the resistance wire 66 varies depending on temperatures. The resistance wire 66 is connected to a sensor circuit 68. A bridge circuit (not shown) is provided on the sensor circuit 68 to detect amount of heat movement, as a resistance variation of the resistance wire 66 in the bridge circuit, generated due to gas flowing in the sensor pipe 64 when a constant current is applied to the resistance wire 66. Further a flow rate of gas, which is actually flowing, is detected based on the detected amount of heat movement. The sensor circuit 68 outputs the detected flow rate of gas as the flow rate signal S1 to the flow rate control main body 58.

The flow rate control valve mechanism 54 includes a flow rate control valve 70 provided in the middle of the main gas pipe 50. The flow rate control valve 70 may adjust an opening degree of a valve by allowing a diaphragm (not shown), formed of a thin metal plate, to approach or distance from, e.g. a valve opening. The opening degree of the valve may be adjusted by an actuator 72 including a piezoelectric element such as a piezo element. The actuator 72 is operated by a driving current applied from a valve driving circuit 74.

The conversion data showing a relationship between the flow rate instruction signal and the target flow rate is previously stored in the conversion data storage unit 56, as shown in FIG. 3. Here, linear conversion data of a plurality of gaseous species, that is, the A and B gases, is stored in the conversion data storage unit 56. Here, the conversion data is shown as a graph for better understanding of the present invention. In the graph of FIG. 3, a horizontal axis represents the flow rate instruction signal Sb input from outside, and a vertical axis represents the target flow rate. If the flow rate instruction signal Sb is an analog signal, the flow rate instruction signal Sb is shown within a voltage range between 0 and 5 volts and is set to have a target flow rate according to a magnitude of a voltage. A flow rate of the flow rate instruction signal Sb at 5 volts becomes full scale at which the gaseous species may be supplied at a maximum flow rate.

Accordingly, here, the A gas may be supplied at a flow rate of 1000 sccm at full scale, and the B gas may be supplied at a flow rate of 2000 sccm at full scale. If the flow rate instruction signal Sb is a digital signal, the horizontal axis represents values corresponding to 0 to 5 volts of an analog signal. Incidentally, the A gas corresponds to, for example, monosilane gas, and the B gas corresponds to $N_2$ gas. The linear conversion data has different gradients according to the gaseous species.

Also, although a linear graph is used as the plurality of pieces of conversion data for better understanding of the present invention, the present invention is not limited thereto. That is, a table or a function showing numerical values of the graphs may be used, and further, anything capable of showing the numerical values may be used as the conversion data.

The flow rate control main body 58 may be, for example, a computer, and may select whether to use the conversion data of the A gas or the conversion data of the B gas of FIG. 3 based on the gaseous species selection signal Sa input from outside. Also, the flow rate control main body 58 calculates the target flow rate based on the selected conversion data and the flow rate instruction signal Sb input from outside. Also, the flow rate control main body 58 may output a valve driving signal S2 to the valve driving circuit 74 and perform, for example, proportional-integral-derivative (PID) control of the flow rate of gas by feedback to achieve the target flow rate.

<Description about the Operation of Processing Apparatus>

Next, operations of the processing apparatus 2 will be described.

First, an operator inputs the process recipe showing the order of processing the semiconductor wafer W as a computer-readable program in the input/output unit 44, and stores the process recipe in, for example, the storage medium 42. Alternatively, the process recipe may be input from outside via communication. The order of operating components of the processing apparatus 2, that is, the order of processes, is previously defined in the process recipe. When inputting the process recipe, process conditions, such as a process pressure, a process temperature, and a process time during processing, gaseous species to be used (information regarding the gaseous species), flow rates (set flow rates) of gaseous species, and opening/closing operations of the opening/closing valves, may be input in the input/output unit 44.

Also, the apparatus controller 40 is configured to specify the gaseous species by associating the processes with the gaseous species to be used in the process recipe in which the order of operating the components of the processing apparatus 2 is previously stored, and specifying the processes of the process recipe as information regarding the gaseous species. In other words, the gaseous species to be used for each process is previously determined. Also, the flow rate of each gaseous species is written in a rewritable table or the process recipe included in the storage medium 42, and a flow rate of gas is determined based on the flow rate of each gaseous species. Here, a case where the input/output unit 44 sets a gaseous species to be used and a flow rate of the gaseous species will be described. For example, a case where the A gas is supplied at a predetermined flow rate, for example, at a flow rate of 400 sccm, for a predetermined period of time and then the B gas is supplied at a predetermined flow rate, for example, at a flow rate of 1000 sccm, for a predetermined period of time will be described.

First, if an instruction to "open" the second opening/closing valve V2 and an instruction to set a flow rate to "400 sccm" are input as information regarding the gaseous species in the input/output unit 44, since conditions "second opening/closing valve V2=A gas" and "third opening/closing valve V3=B gas" are previously set, the instruction to "supply the A gas at a flow rate of 400 sccm" is input in the apparatus controller 40.

Similarly, if an instruction to "open" the third opening/closing valve V3 and an instruction to set a flow rate to "1000 sccm" are input as information regarding the gaseous species in the input/output unit 44, an instruction to "supply the B gas at a flow rate of 1000 sccm" is input in the apparatus controller 40.

During manipulation of inputting the information, if an instruction to "open the second opening/closing valve V2" is input, since the apparatus controller 40 specifically recognizes the "A gas", "1000 sccm" is displayed on the display unit 46 as the maximum flow rate at which the A gas is supplied, i.e., a full scale value. Accordingly, referring to the full scale value displayed on the display unit 46, the operator may prevent generation of an input error without inputting a value greater than the full scale value.

Similarly, if an instruction to "open the third opening/closing valve V3" is input, since the apparatus controller 40 recognizes "supplying of the B gas", "2000 sccm" is displayed on the display unit 46 as the maximum flow rate at which the B gas is supplied, i.e., a full scale value. Accordingly, referring to the full scale value displayed on the display unit 46 the operator may prevent generation of an input error without inputting a value greater than the full scale value.

The process recipe including the above-described instructions is stored in the storage medium 42. Also, when processing of the semiconductor wafer W is actually performed, the processing is performed according to the process recipe stored in the storage medium 42.

Then, a case where processing of the semiconductor wafer W is actually performed and a process of supplying gases is performed will be described. First, when the apparatus controller 40 outputs an instruction to "supply the A gas at a flow rate of 400 sccm" based on the process recipe, the communication board 40A of the apparatus controller 40 outputs the gaseous species selection signal Sa and the flow rate instruction signal Sb to the flow rate controller 30 via the communication line 48. In this case, the gaseous species selection signal Sa includes content to select the "A gas", and the flow rate instruction signal Sb includes content to instruct a flow rate of "400 sccm". At this time, the second opening/closing valve V2 of the branched gas passage 32 is in an open state, and thus the second opening/closing valve V2 is ready to supply the A gas.

The communication unit 60 of the flow rate controller 30 receives both the gaseous species selection signal Sa and the flow rate instruction signal Sb, and the received gaseous species selection signal Sa and flow rate instruction signal Sb are transmitted to the flow rate control main body 58. The flow rate control main body 58 selects conversion data for the A gas from the conversion data stored in the conversion data storage unit 56, as shown in FIG. 3, based on the gaseous species selection signal Sa and the flow rate instruction signal Sb, and obtains a target flow rate at this time. Here, since the communication is digital communication, the flow rate instruction signal Sb includes content corresponding to "2 volts" of an analog signal.

In FIG. 3, the target flow rate, which is an intersection between a line of the conversion data of the A gas and a portion corresponding to "2 volts" of the analog signal, is "400 sccm". The flow rate control main body 58 outputs the valve driving signal S2 to the valve driving circuit 74 of the flow rate control valve mechanism 54 to drive the actuator 72 and open the flow rate control valve 70, and thus the A gas is supplied. At the same time, the flow rate control main body 58 performs PID control by using the flow rate signal S1, as a feedback signal, applied from the sensor circuit 68 of the flow rate detecting unit 52 to stably supply the A gas at a flow rate of 400sccm, which is the target flow rate.

At this time, the flow rate signal S1 detected by the sensor circuit 68 is used for the above-described control and is also transmitted to the apparatus controller 40 from the communication unit 60 for confirmation. The above-described flow will be simply described as follows,

[Information regarding gaseous species (specification of opening/closing valve)/input of corrected flow rate (specification of gaseous species)]→[transmission of gaseous species selection signal Sa/flow rate instruction signal Sb]→[specification of target flow rate of specified gaseous species]→[PID control by feedback to achieve target flow rate].

The B gas may be supplied through the same process as the A gas. In other words, when the apparatus controller 40 outputs an instruction to "supply the B gas at a flow rate of 1000 sccm" based on the process recipe, the communication board 40A of the apparatus controller 40 outputs the gaseous species selection signal Sa and the flow rate instruction signal Sb to the flow rate controller 30 via the communication line 48. In this case, the gaseous species selection signal Sa includes content to select the "B gas", and the flow rate instruction signal Sb includes content to instruct a flow rate of "1000 sccm". At this time, the third opening/closing valve V3 of the branched gas passage 34 is in an open state, and thus the third opening/closing valve V3 is ready to supply the B gas.

The communication unit 60 of the flow rate controller 30 receives both the gaseous species selection signal Sa and the flow rate instruction signal Sb, and the received gaseous species selection signal Sa and flow rate instruction signal Sb are transmitted to the flow rate control main body 58. The flow rate control main body 58 selects conversion data for the B gas from the conversion data stored in the conversion data storage unit 56, as shown in FIG. 3, based on the gaseous species selection signal Sa and the flow rate instruction signal Sb, and obtains a target flow rate at this time. Here, since the communication is digital communication, the flow rate instruction signal Sb includes content corresponding to "2.5 volts" of an analog signal.

In FIG. 3, the target flow rate, which is an intersection between a line of the conversion data of the B gas and a portion corresponding to "2.5 volts" of the analog signal, is "1000 sccm". The flow rate control main body 58 outputs the valve driving signal S2 to the valve driving circuit 74 of the flow rate control valve mechanism 54 to drive the actuator 72 and open the flow rate control valve 70, and thus the B gas is supplied. At the same time, the flow rate control main body 58 performs PID control by using the flow rate signal S1, as a feedback signal, applied from the sensor circuit 68 of the flow rate detecting unit 52 to stably supply the B gas at a flow rate of 1000 sccm, which is the target flow rate.

At this time, the flow rate signal S1 detected by the sensor circuit 68 is used for the above-described control and is also transmitted to the apparatus controller 40 from the communication unit 60 for confirmation. As described above, the flow of the B gas is performed in the same manner as the A gas.

In a conventional flow rate controller, since a piece of conversion data, for example, conversion data only for the A gas, is set as conversion data, when the B gas is supplied, a flow rate of the B gas to be supplied by an operator, that is, a flow rate of 1000 sccm, should be corrected by using a conversion factor value to calculate a corrected flow rate. Also, since the correction flow rate should be input, the operator may experience difficulties, and an error may occur when calculating the corrected flow rate. However, in the present invention, since there is no need to calculate the corrected flow rate by using the conversion factor value, for example, when supplying the B gas, the operator may not experience difficulty.

As such, in the present invention, the flow rate controller 30, which controls a flow rate of gas to be supplied through the gas passage 28, may not need to perform a complicated manual calculation using a conversion factor value, which has been conventionally performed when making the process recipe showing a detailed processing manner of the semiconductor wafer W. Thus, the flow rates of the plurality of gaseous species may be controlled without performing a complicated manipulation.

Also, in the above-described embodiment, the gaseous species to be used is specified by associating the second and third opening/closing valves V2 and V3 with the gaseous species, that is, the A and B gases, and specifying an opening/closing valve to be in an open state as information regarding the gaseous species. However, the present invention is not limited thereto, and a gaseous species to be used as information regarding the gaseous species may be directly input. In this case, instructions regarding opening/closing operations may be independently given to the second and third opening/closing valves V2 and V3. As such, the manner of inputting information to the input/output unit 44 is not specially limited.

Also, although a case of using two types of gaseous species has been described in the above-described embodiment, the present invention is not limited thereto. That is, the present invention may be applied to a case of using three or more types of gaseous species. In this case, conversion data corresponding to the three or more types of gaseous species are previously stored in the conversion data storage unit 56.

Also, although a case where the flow rate controller 30 and the apparatus controller 40 perform digital communication has been described in the above-described embodiment, the present invention is not limited thereto. That is, the flow rate controller 30 and the apparatus controller 40 may also perform analog communication. Also, here, a batch-type processing apparatus, which simultaneously processes a plurality of semiconductor wafers, has been described. However, the present invention is not limited thereto, and the present invention may be applied to a single-type processing apparatus which individually processes a plurality of semiconductor wafers.

<Example of Operations in Actual Film Formation>

Figure 4:
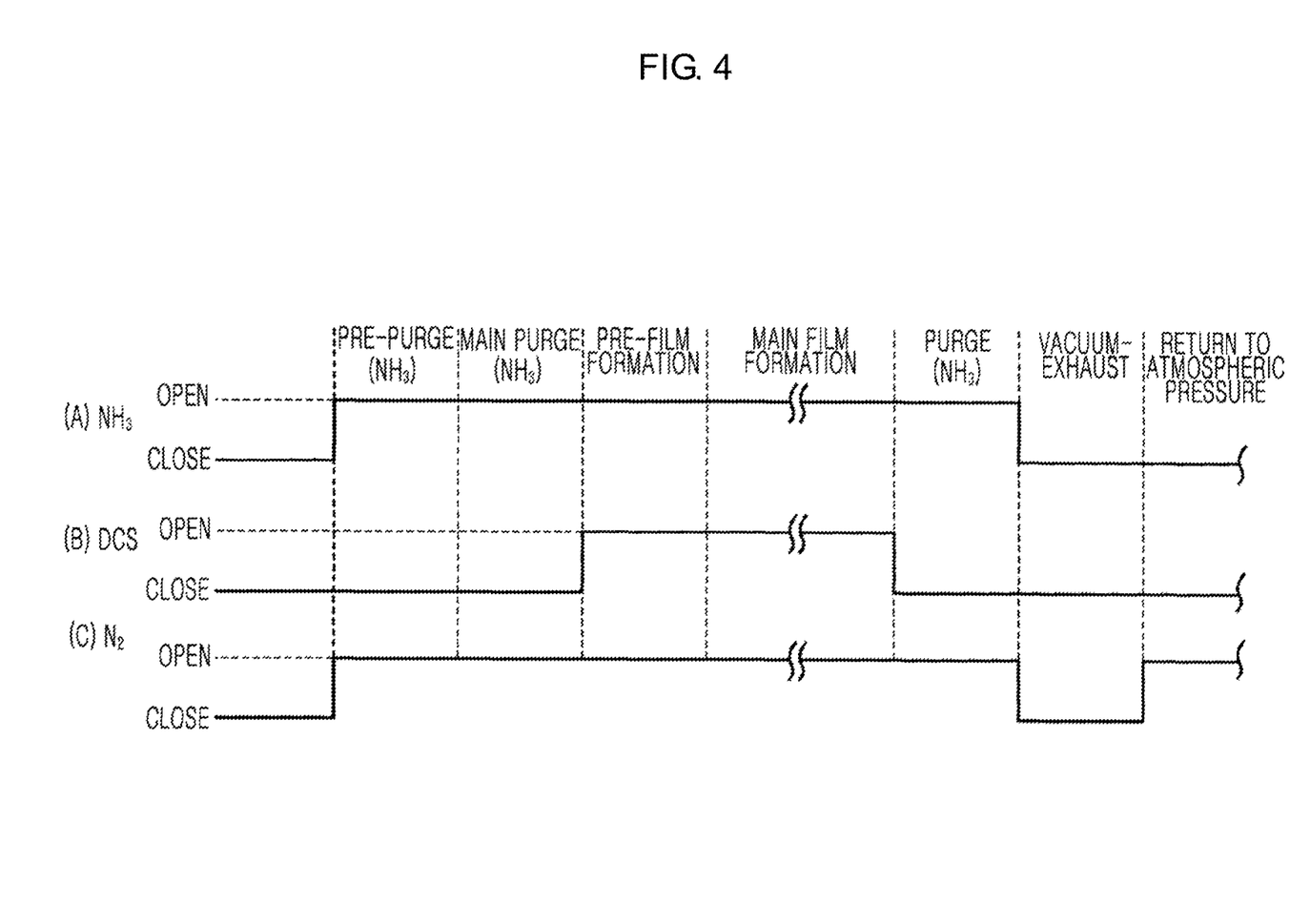
FIG. 4 is timing charts for describing supplying of gases when forming an SiN film according to the embodiment of the present invention.

Hereinafter, an example of operations when film formation is actually performed will be described. Here, a case of forming a silicon nitride (SiN) film will be described. FIG. 4 is timing charts for describing supplying of gases when forming the SiN film according to an embodiment of the present invention. Here, ammonia ($NH_3$) (see (A) of FIG. 4), dichlorosilane (DCS) (see (B) of FIG. 4), and nitrogen ($N_2$) (see (C) of FIG. 4) are used as examples of gaseous species. Thus, a plurality of gas supply systems corresponding to three types of gaseous species are provided as the gas supply system 26 shown in FIG. 1, and the flow rate controller 30 corresponding to the gaseous species is provided, as described above, in each of the gas supply systems. Also, the whole operation of the processing apparatus is performed by the single apparatus controller 40.

As described above, the process recipe storing an order of processes for performing the firm formation is previously read into, for example, a computer. The gaseous species used in the processes are previously determined by specifying the processes by the process recipe. Furthermore, a flow rate of gas for each of the processes is previously determined.

In FIG. 4, "open" means opening of an opening/closing valve for introducing the corresponding gaseous species into the processing container 6, and "close" means closing of the opening/closing valve. The gaseous species selection signal Sa and the flow rate instruction signal Sb are transmitted in each process according to the process recipe, and as described above, an actual target flow rate is calculated with reference to the graph of the conversion data shown in FIG. 3 and is controlled.

First, if the semiconductor wafer W that is not processed is transferred to the wafer boat 8 that is unloaded, the wafer boat 8 is moved up to be loaded into the processing container 6, and the inside of the processing container 6 is sealed by the cover unit 10. For example, about 50 to 150 semiconductor wafers W are held by the wafer boat 8. Then, after leak checking is performed, the process proceeds to an actual film forming process.

First, a temperature of the semiconductor wafer W is increased to the process temperature by the heating unit 12 and, the process temperature is maintained. Then, in a pre-purge process of ammonia, opening/closing valves for ammonia gas and nitrogen gas are opened to supply both the ammonia gas and the nitrogen gas at predetermined flow rates, thereby performing the pre-purge process of ammonia. Additionally, both the ammonia gas and the nitrogen gas are continuously supplied after the pre-purge process of ammonia, thereby performing a main purge process of ammonia.

Then, an opening/closing valve for DCS gas is opened to supply the DCS gas at a predetermined flow rate in addition to both the ammonia gas and the nitrogen gas, thereby performing a pre-film forming process. Also, the three gases are continuously supplied to perform a main film forming process. Thus, a silicon nitride film is formed on a surface of the semiconductor wafer W. As described above, the flow rates of gases are set for the respective processes. If the film forming process is finished, the opening/closing valve for the DCS gas is closed to stop the supply of the DCS gas, and the other ammonia gas and nitrogen gas are continuously supplied to perform the purge process of ammonia.

Then, if the purge process is finished, both the opening/closing valve for the ammonia gas and the opening/closing valve for the nitrogen gas are closed to stop the supply of both the ammonia gas and the nitrogen gas. In this state, only the exhaust system 18 is continuously operated to perform vacuum exhaust process which vacuum-exhausts the atmosphere inside the processing container 6 to a lower pressure. Then, the opening/closing valve for the nitrogen gas is opened to introduce the nitrogen gas into the processing container 6, and thus, the inside of the processing container 6 is returned to atmospheric pressure. Then, the wafer boat 8 is moved down to unload the processed semiconductor wafer W from the inside of the processing container 6, thereby completing a single batch film forming process. The film forming process is just an example, and the present invention may be applied to other processing manners.

Also, here, although a semiconductor wafer has been described as a processing target, a silicon substrate or a compound semiconductor substrate formed of, e.g., GaAs, SiC, or GaN, may be used as the semiconductor wafer. Furthermore, the present invention is not limited to these substrates, and the present invention may be applied to a glass substrate or a ceramic substrate used in a liquid crystal display (LCD) device.

According to a flow rate controller and a processing apparatus of the present invention, the following effects may be obtained:

In a flow rate controller for controlling a flow rate of gas supplied through a gas passage, a complicated manual calculation using a conversion factor value, which has been conventionally performed, may be unnecessary when making a process recipe showing a detailed processing manner of a processing target. Thus, flow rates of a plurality of gaseous species may be controlled without performing a complicated manipulation.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A processing apparatus which performs processing on a processing target, the processing apparatus comprising:
a processing apparatus main body which comprises a processing container accommodating the processing target and performs processing on the processing target;
an exhaust system which exhausts the inside of the processing container;
a main gas passage which is connected to the processing container;
a flow rate controller which controls a flow rate of gas in the main gas passage, the flow rate controller comprising:
a main gas pipe which is connected to the main gas passage;
a flow rate detecting unit which is configured to detect a flow rate of gas in the main gas pipe and output a flow rate signal;
a flow rate control valve mechanism which is provided on the main gas pipe and controls a flow rate by changing an opening degree of a valve;
a conversion data storage unit which is configured to store a plurality of pieces of conversion data corresponding to a plurality of gaseous species, each of the plurality of pieces of conversion data indicating a target flow rate corresponding to a flow rate instruction signal; and
a flow rate control main body which is configured to select the corresponding conversion data from the plurality of pieces of conversion data based on a gaseous species selection signal input from outside, read from the corresponding conversion data the target flow rate corresponding to the flow rate instruction signal input from outside, and control the flow rate control valve mechanism based on the target flow rate and the flow rate signal;
a plurality of gas passages into which the main gas passage is branched and each of which has an opening/closing valve to supply a plurality of gaseous species to the main gas passage;
an apparatus controller which comprises an input unit configured to input processing information comprising information regarding the gaseous species and a target flow rate, and which is configured to control the processing apparatus based on the processing information; and
a display unit which is configured to display a maximum flow rate of each gaseous species at which each gaseous species is capable of being supplied to the main gas passage.

2. The processing apparatus of claim 1, wherein the apparatus controller generates a gaseous species selection signal based on the information regarding the gaseous species.

3. The processing apparatus of claim 2, wherein the apparatus controller is configured to specify gaseous species by previously associating the gaseous species with the opening/closing valve and specifying the opening/closing valve as the information regarding the gaseous species.

4. The processing apparatus of claim 1, wherein the apparatus controller is configured to specify the gaseous species by previously associating processes with the gaseous species to be used in a process recipe in which the order of operating components of the processing apparatus is previously stored, and specifying the processes of the process recipe as the information regarding the gaseous species.

* * * * *